United States Patent [19]

Mercusot et al.

[11] Patent Number: 5,646,338
[45] Date of Patent: Jul. 8, 1997

[54] DEPOSITION SENSING METHOD AND APPARATUS

[75] Inventors: Michel Mercusot, Antwerp; Ghislain Declercq, Pittem, both of Belgium

[73] Assignee: BetzDearborn Inc., Trevose, Pa.

[21] Appl. No.: 461,073

[22] Filed: Jun. 5, 1995

[51] Int. Cl.⁶ ............................................. G01N 17/00
[52] U.S. Cl. ........................................ 73/86; 162/42
[58] Field of Search .................. 73/86, 782, 861.71, 73/861.72; 162/49, 263, 42; 118/712; 427/8–10; 33/DIG. 13

[56] References Cited

U.S. PATENT DOCUMENTS

| | | | |
|---|---|---|---|
| 2,917,922 | 12/1959 | Morse | 73/861.71 |
| 4,095,658 | 6/1978 | Kendall et al. | |
| 4,553,137 | 11/1985 | Marxer et al. | 340/582 |
| 4,562,725 | 1/1986 | Oka et al. | 73/29 |
| 4,893,935 | 1/1990 | Mandel et al. | 356/436 |
| 4,910,877 | 3/1990 | Sokol | 33/DIG. 13 |
| 4,992,380 | 2/1991 | Moriarty et al. | 436/55 |
| 5,006,311 | 4/1991 | Hoots et al. | 422/62 |
| 5,155,555 | 10/1992 | Wetegrove et al. | 356/244 |
| 5,158,662 | 10/1992 | Osborne | 204/403 |
| 5,171,450 | 12/1992 | Hoots | 210/701 |
| 5,190,728 | 3/1993 | Robertson et al. | 422/68.1 |
| 5,246,560 | 9/1993 | Nekoska et al. | 204/400 |
| 5,264,917 | 11/1993 | Wetegrove et al. | 356/382 |
| 5,281,537 | 1/1994 | Robertson et al. | 436/62 |

FOREIGN PATENT DOCUMENTS

| | | | |
|---|---|---|---|
| 528726 | 7/1931 | German Dem. Rep. | 341/14 |
| 1087475 | 10/1967 | United Kingdom. | |
| 2227316 | 7/1990 | United Kingdom | G01N 15/06 |

OTHER PUBLICATIONS

Donelan et al., "Miniature drag sphere velocity probe", Rev. Sci. Inst., Mar. 1978.

Database WPI, Section PQ, Week 8821, Derwent Publications Ltd., London, GB, Class Q75, AN 88–140945 & DD,A,252 872 (VEB MASCH HALLE), Dec. 30, 1987.

Tappi Journal, vol. 70, No. 1, Atlanta US, pp. 43–45, Springer et al, "Fundamental Strategy for Control of Retention and Drainage on a Modern Paper Machine".

*Primary Examiner*—Robert Raevis
*Attorney, Agent, or Firm*—Alexander D. Ricci; Matthew W. Smith

[57] ABSTRACT

A sensor for deposit build-up in plant, for example a paper-making installation, comprising a probe mounted with respect to a mounting body and including at least one strain gauge for measuring the flexural strain in a flexurally deformable body strained by imbalance in the probe in response to the combined mass of the probe and the deposit build-up thereon. The process of the invention envisages using the resulting signal for controlling the application of a deposit-controlling composition. An optional further sensor enables detection of the nature of the deposition whose quantity is sensed by the strain gauge.

12 Claims, 3 Drawing Sheets

DEPOSITION SENSING METHOD AND APPARATUS

FIELD OF THE INVENTION

The present invention relates to a method of and apparatus for sensing the build-up of deposition, in particular in locations which are not readily accessible for manual observation.

The process is particularly useful for monitoring the build-up of deposit in contaminated industrial water, for example in cooling water circuits, boiling water enclosures, and paper pulp machinery to give but a few examples. Another application is in smoke stack soot monitoring. In each case the method and apparatus enable one or more deposition-controlling composition to be applied in an appropriate dose.

PRIOR ART

Many industrial processes suffer from formation of deposit on surfaces. This deposit could be of microbiological origin in equipment such as Evaporative Cooling Towers, water boilers, or machines in the paper making industry, but could also be formed by precipitation of inorganic materials (scaling) or deposition of adhesives, ink, etc, . . . in recycled papermaking processes.

It is known to monitor the build-up of a deposit by providing a surface on which the film is allowed to build up and then periodically moving that surface to a location where it can be observed in order to evaluate the degree of build-up. Such a system is disclosed in U.S. Pat. No. 5,155,555 (Nalco Chemical Company).

Another approach has been to monitor the acquisition of moisture by a piezoelectric crystal by observing the change in the resonant frequency when the crystal is subject to electrical excitation. Such a system is disclosed in U.S. Pat. No. 4,562,725. The alteration of the properties of the crystal resulting from the presence of moisture is unique to the action of water in the crystal and consequently this action would be thought unsuitable for monitoring deposits containing small amounts of water.

Yet a further approach, which can be used with a solid build-up if a substantial build-up is expected, is disclosed in DD-A-2,52872 in which the accretion of ice in an evaporator is monitored, for purposes of triggering defrosting of the evaporator, by measuring the bending stress on a cantilever support for the evaporator.

GB-A-1087475 and U.S. Pat. No. 4,553,137 both monitor the build-up of ice on an aircraft by having an exposed part of a detector probe in the region where ice is to build up, and then driving the probe for longitudinal vibrations by a magnetostrictive effect in order to detect the build-up of ice as a function of the changes in the resonant frequency of the vibrating probe due to the loading of the ice thereon.

GB-A-2227316 discloses a dust monitor in which dust is allowed to deposit on a piezoelectric crystal in the drive circuit to a vibrator, whereby the amount of dust on the crystal affects the driving of the vibrator to change the frequency of the vibrator, and hence measurement of the vibrator frequency gives an indication of the quantity of dust present.

OBJECTS OF THE INVENTION

It is an object of the present invention to provide a means of sensing the build-up of deposition on the surfaces of an industrial installation, without the need for visual observation of the deposit.

It is a further object of the present invention to provide a sensor for sensing the build-up of deposit by simple response to the change in mass of the sensor without the need to provide means for driving the sensor in vibration.

SUMMARY OF THE INVENTION

Accordingly, one aspect of the present invention provides a method of measuring the build-up of deposit, comprising mounting an elongate probe to project into a region where the build-up will appear; balancing the probe about a pivot in the absence of deposit on the projecting probe; allowing the deposit to build up on the projecting portion of said probe; and sensing lateral deflection of said projecting portion of the probe at said pivot by changing strain on a flexible member caused to flex by the imbalance generated in said probe as a result of the deposit thereon, to detect variations in the mass of said probe as being indicative of the build-up of said deposit on the projecting portion of the probe.

A further aspect of the present invention provides a sensor for determining the build-up of a deposit in industrial equipment, comprising: an elongate probe adapted to be installed with a distal end projecting into a region of the equipment where monitoring is to be effected; a pivot support for said probe; a flexurally deformable member arranged to be strained flexurally by pivoting of said probe about said pivot support; at least one strain gauge for measuring the flexural strain of said flexurally deformable member in response to the weight of the probe and any accretion of deposit built up thereon; and means for monitoring the magnitude of the flexural strain continuously through the life of the plant.

Yet a further aspect of the invention provides industrial equipment in which a deposit forms in use of the equipment, including a sensor for determining the build-up of said deposit, said sensor comprising an elongate probe installed in a region of the equipment where the deposit builds up; means mounting said probe resiliently in relation to the plant whereby the probe can oscillate by angular displacement about a datum position in response to natural vibrations of the equipment; means for monitoring the vibrations of the probe in response to said machine vibrations; and means for evaluating the frequency of said vibrations as being indicative of the resonant frequency of the combination of the probe and any deposit thereon.

BRIEF DESCRIPTION OF THE DRAWINGS

In order that the present invention may more readily be understood, the following description is given, merely by way of example, with reference to the accompanying drawings in which.

DETAILED DESCRIPTION OF THE PREFERRED EMBODIMENTS

Figure 1:
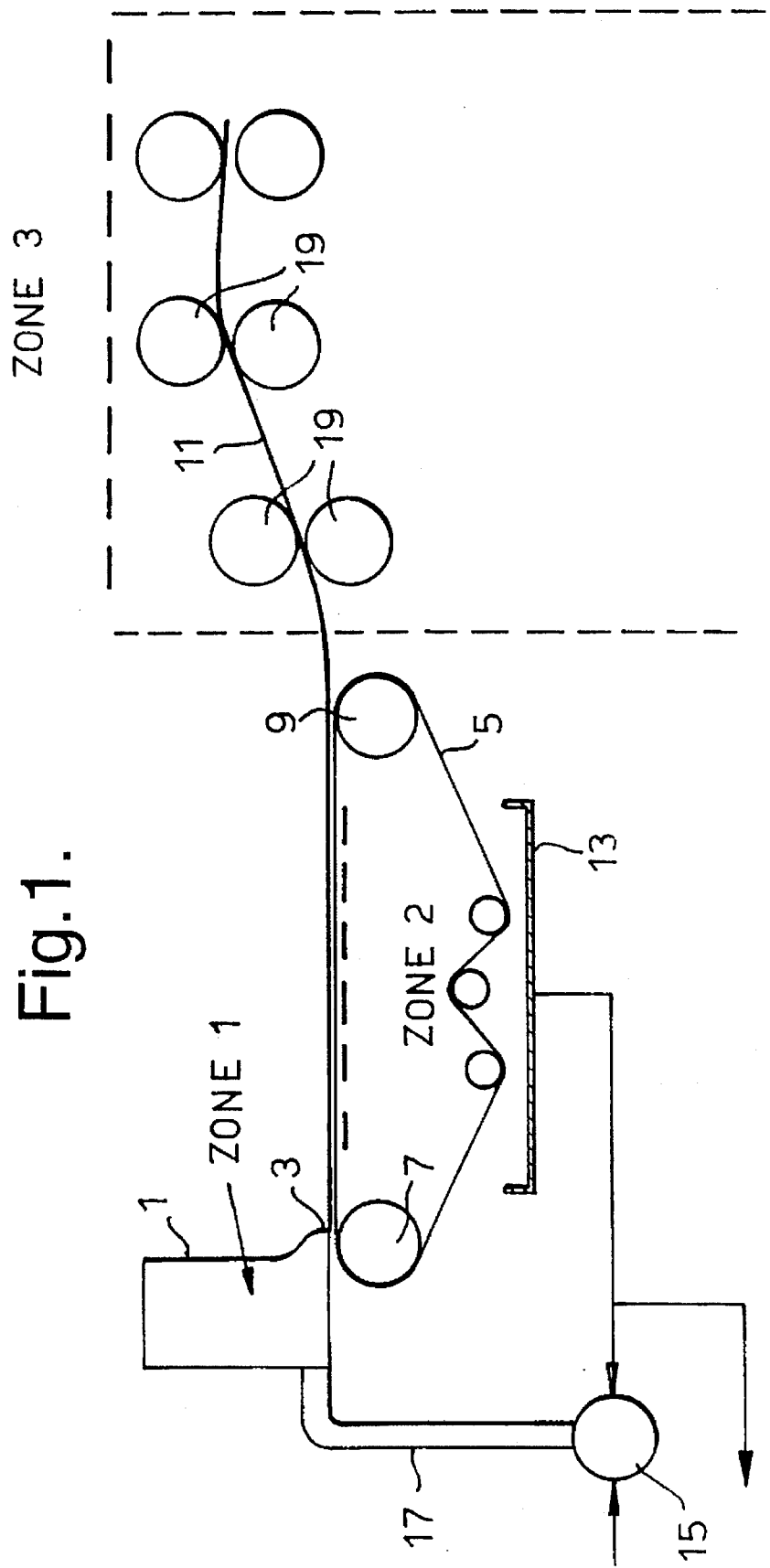
FIG. 1 is a schematic side view of a paper mill in which, for example, the sensing method and apparatus of the invention can be usefully employed.

Referring now to the drawings, which exemplify the invention in terms of monitoring of build-up of pulp and other particles with a biological film in paper making equipment, there will be seen only one possible application for the present invention. Various other applications are possible, as indicated above.

The precise nature of the environment in which the deposition sensing method and apparatus of the present invention are capable of being applied is not crucial to the present invention and thus the illustration, in FIG. 1, of a single application in the form of a paper making installation is considered adequate to illustrate the use of the invention.

Furthermore, although in the present context the sensing of the build-up of a biological film deposit in paper making machinery is taken as the downline control which can be exercised as a result of the signal resulting from the method and apparatus of the invention, it will be understood that other downline control operations may be exercised as a result of the use of the invention. For example, where the probe is sensing the build-up of scale in a boiler water circuit or an evaporative water cooling installation the downline operation to be carried out in response to the signal from the process and apparatus of the invention may be the addition of a composition for dispersing and/or preventing scale deposits in the water; and where the probe is monitoring the build-up of soot in a smoke stack the downline operation may comprise the timing of periodical soot blowing operations or the addition of soot-dispersing compositions. This concept can be extended to any other industrial application in which the probe is used to measure the deposit of build-up over a period of time.

Referring now to the papermaking equipment shown in the drawings, FIG. 1 shows the headbox 1 which supplies a pulp suspension at 3 to the wire 5 which is guided through a settling zone defined between wire supporting rolls 7 and 9 over a zone 2 through which water and tiny pulp particles from the forming paper web 11 on the wire will fall, eventually to be caught by a wire pit 13 from which the recovered liquid can be recycled into the headbox by way of a pump 15 and recycle pipe 17.

The paper web 11 is then passed through press zone 3 over press rolls 19 which serve to remove the water.

It is known that there are tendencies of deposition of various components in zone 1 within the headbox, and which can tend to cause an undesirable build-up at the outlet from the headbox 1, and also in the zone 2 region below the horizontal run of the wire on which the wet pulp begins its de-watering treatment as well as in the press section zone 3.

The build-up of pulp particles and of deposit in these three zones can upset the stable operation of the paper making process and it is therefore desirable to control the build-up of deposit using a chemical treatment by adding one or more controlling composition to the wet pulp going to the headbox 1. Excessive doses of these treatment chemicals will mar the quality of the finished paper web 11, and will be unnecessarily expensive but equally insufficient dosage will allow the deposit to build up to an extent where it fragments from the inner surfaces of the headbox and of the de-watering zone and possibly appears as defects and sometimes causes holes in the finished paper web 11. It is therefore important to be able to control the build-up of deposit at all times, so that there is no excessive build-up but equally no excessive dosing of chemicals to counter that build-up.

Figure 2:
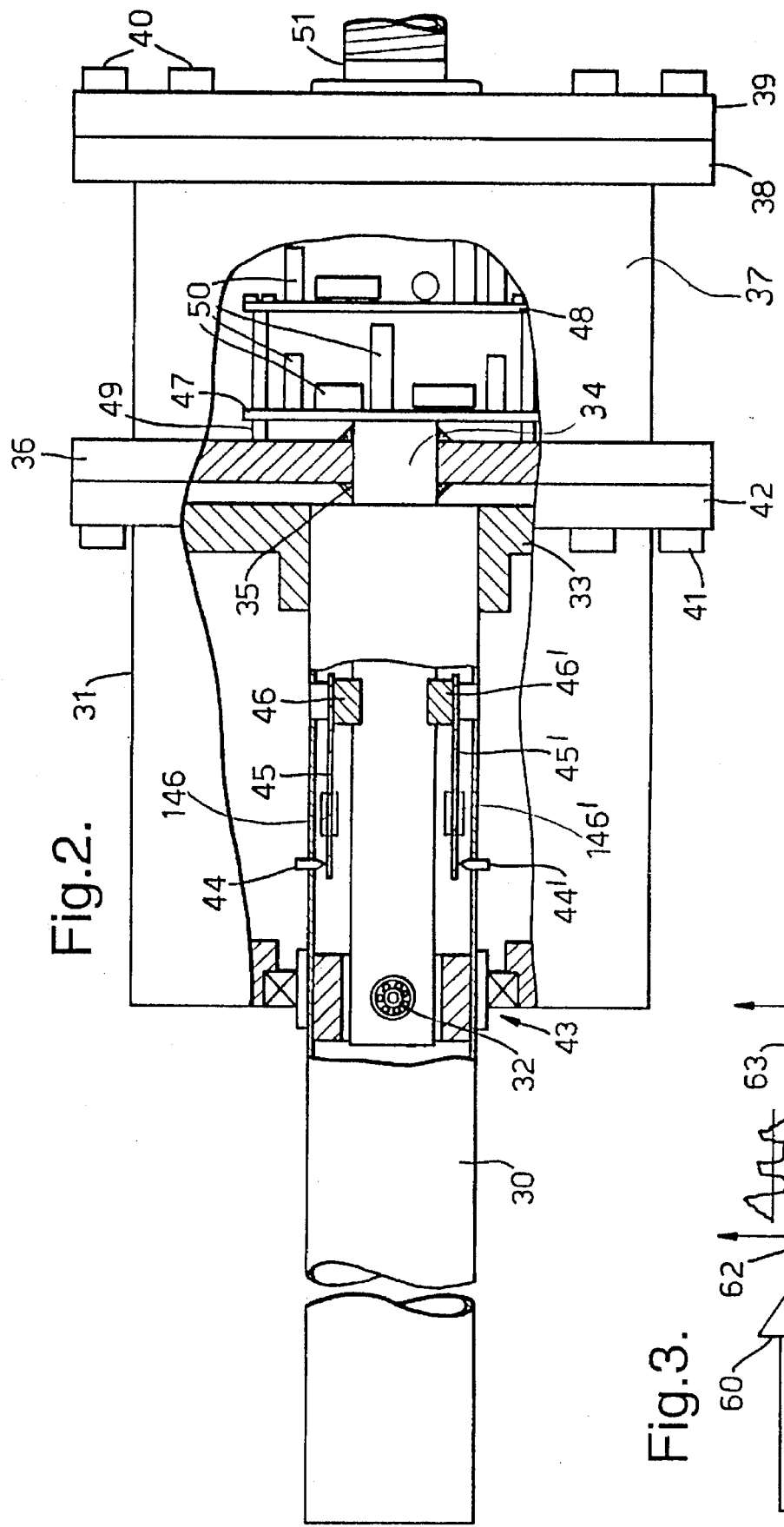
FIG. 2 is a side elevational, partly sectional view of a first embodiment of sensor in accordance with the present invention.

In order to monitor the build-up of the deposit, we now propose to incorporate at a location within the paper-making machine, for example within the de-watering zone 2, at least one sensor of the type shown in FIG. 2.

FIG. 2 shows a first embodiment of the sensor as comprising an elongate probe 30 in the form of a stainless steel tube, mounted in a mounting body 31 by means of a pivot bearing 32 at the centre of gravity of the probe. The part of the probe to the left of the bearing 32 is shown foreshortened, whereas the portion to the right of the bearing is shown in its full length, and this comprises at its end a counterbalance mass 33 in order to ensure that when the probe 30 is free of any external deposit it will balance exactly around the bearing 32 which is nearer one end of the tube. When the exposed left hand part of the probe 30 becomes laden with a deposit, that part will be heavier and the probe will tend to settle with the left hand side low.

The bearing is carried by an inner rod 34 which is welded at 35 to a carrier disc 36 itself integral with a rear housing portion 37 enclosing the electrical connections and part of the circuitry for the sensor output.

The opposite end of the rear housing portion 37 has an integral external flange 38 to which a cover 39 is secured by bolts 40. Likewise the mounting body portion 31 is secured to the carrier disc 36 by way of mounting bolts 41 clamping an end flange 42 of the mounting body 31 to the carrier disc 36 of the rear body portion 37.

Surrounding the centre of gravity of the tubular probe 30, at the same axial station as the bearing 32, is an external seal arrangement 43 to prevent ingress of the materials borne by the atmosphere around the left hand part of the probe 30 from entering the interior of the mounting body portion 31.

Upper and lower adjusting screws 44 and 44', respectively, are threadedly engageable in the wall of the stainless steel tube defining the probe 30 and are in register with the tips of upper and lower spring blades 45, 45' which are carried by the inner rod 34 by means of upper and lower mountings 46 and 46', respectively.

Within the rear housing portion 37 at the right hand end of the mounting body portion are two printed circuit boards 47 and 48 which are carried by an array of mounting studs 49 threadedly engageable in the carrier disc 36. These printed circuit boards carry the necessary circuit elements, schematically illustrated at 50, to form the output circuitry of the sensor.

The output signal is conveyed to an external control unit, which may be effective to control the dosage of deposit-inhibiting or -controlling compositions by way of a conduit 51 providing a waterproof seal to the rear housing portion 37 by way of its cover 39.

The spring blades 45 and 45' each carry strain gauges 146 and 146' to measure the flexural strain on the respective blades, thereby allowing the amplitude of displacement of the probe from the horizontal position to be measured (in terms of the flexural strain on one or other of the blades). For example, when the probe tilts in the anti-clockwise direction as viewed in FIG. 2 the adjustment screw 44' will rise to deflect the left hand end of the spring blade 45' upwardly, thereby generating strain on the strain gauges associated with the blade 45'.

Assuming that the upper adjuster screw 44 has been adjusted so that it just touches the left hand tip of the upper blade 45 then the increased bending on lower spring blade 45' may occur simultaneously with a slight relaxation of the bending on the upper spring blade 45, giving confirmation of the signal. This may be particularly relevant if the balance of the probe 30 is not precise, in which case slight residual flexure on the upper blade 45 may be necessary in order to retain the probe in the horizontal position when free of deposit.

Clearly the distance between the screws 44, 44' on the one hand and the bearing 32 on the other hand is much shorter than the total length of the probe 30 projecting (leftwardly), into the region where the build-up is expected, so when such a build-up forms on that projecting part of the probe 30 the average moment arm of the build-up about the axis of rotation of the bearing 32 will be much greater than the moment arm of the point of application of the force from the spring blades 45, 45' on the associated adjustment screw 44, 44' on the probe. Hence the effect of the force contributing to the total moment of the deposit to the lefthand side of the axis of bearing 32 will be magnified by virtue of the much shorter moment arm of the force at the screw 44. This force magnification effect allows a relatively small deposit on the projecting portion of the probe 30 to be amplified in its application to the spring blades 45 and 45', making this probe particularly suitable for measuring small deposits.

Furthermore, the flexibility of the blades 45 and 45' results in their receiving appreciable flexural deformation as a result of the force applied from the screw 44 or 44', such that the signal from the strain gauge on the flexurally strained blade 45 or 45' will have an easily detectable output which can be measured in milliamps.

The system thus relies on a freely pivotable probe statically balanced in the absence of any deposit thereon and caused to pivot (substantially without flexural deformation of the probe) in response to the acquisition of a build-up so as to deflect a resilient member under strain in response to the effect of the build-up.

Figure 3:
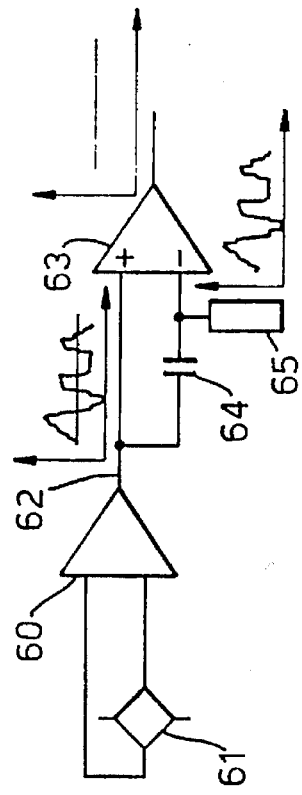
FIG. 3 is a view of part of the output circuitry to eliminate the influences of machine vibrations on the output signal from the sensor.

Bearing in mind the free pivotal mounting of the probe 30 in FIG. 2, it may be important to eliminate the effects of any general machine vibrations from this form of sensor and for that purpose the circuitry of FIG. 3 may be useful. This comprises an amplifier 60 connected across opposite sides of a measuring bridge 61 so that imbalance in the bridge will give rise to imbalance on the inputs of the amplifier and the difference can then be amplified at the amplifier output 62. This output signal is applied directly to one input of a differential amplifier 63 and a tapping from the output is taken through a RC network comprising a capacitor 64 and a resistor 65, with the result that the transient component of the output signal from the first amplifier 60 remains on the second input of the differential amplifier 63 while the static component is reduced to zero. Thus, the output of the differential amplifier will subtract the two input signals to eliminate the transient component and to leave the static component. In practice, such a circuit has been found to give an attenuation of −80 db in the vibration-responsive (transient) component of the signal.

In the preferred form of the sensor the probe may be associated with a further transducer in the form of an analyser cell which reacts in response to the composition of the deposit. Such a further cell may, for example but not necessarily, be mounted on the exterior of the probe. In the case of such a further cell the deposit monitoring sensor can detect not only the quantity of deposit but also its nature, (biological, inorganic . . . ) in order that the deposit-controlling composition introduced into the headbox 1 will be appropriate for the predominant constituent of the deposit growth being controlled.

Thus, in the present sensor one of the circuit boards 47 and 48 may be connected to this analyser cell.

The analyser cell may, for example, work on the basis of a voltage differential responsive to the chemical action of the deposit thereon, or as a result of change in capacitance of the cell in response to the nature of a build-up thereon, or may work in response to biological oxygen demand.

The outlet leads from the respective printed circuit boards 41 and 43 may be connected to appropriate pins of a multi-pin connector (not shown).

The sensor shown in FIG. 2 is suitable for use in many environments but, where only a small build-up of deposit is expected, it may be advantageous to use a modified monitoring head in which the cantilever probe 30 is extended outwardly (towards the right in FIG. 2) so that the strain gauge is positioned near the midpoint of the probe 30 to give a substantially balanced configuration when there is no deposit present on the left hand half of the sensor probe. When, in this case, deposit builds up on the left hand half of the probe, the signal sensed by the strain gauges will no longer be in equilibrium and the effect of the growth of deposit on the left hand part of the probe will be more noticeable as a departure from a zero signal.

A further possibility is for the probe to be able to vibrate by angular displacement about the datum position shown in FIG. 2, in response to the general level of mechanical vibrations in the machine being monitored and for the resonant frequency of the probe to be detected so as to indicate the build-up of deposit on the probe as a function of the variation of the resonant frequency of the probe (indicative of the moment of inertia of the probe about its point of support at the bearing 32). This version of the sensor relies on the fact that a change in the mass of the probe, particularly in the form of a build-up of mass remote from the mounting (pivot) of the probe, will change the moment of inertia of the probe and this in turn will change the natural frequency of vibration (the resonant frequency) of the probe. Vibration of the probe is triggered by general machine vibrations (or possibly by a special vibrator if desired) and the probe will then vibrate most readily at its natural frequency (which will change when the mass is changed, as in the case of selecting an appropriate one of a set of metallic musical tuning forks each of which will resonate at its own natural frequency pitch, different from those of the other forks in the set).

By relying on the natural vibrations in the paper-making mill, it is possible to avoid the need for any moving parts such as a mechanical vibrator to be incorporated in the sensor, and yet at the same time information derived from the value of the natural (resonant) frequency of the probe 30 will allow determination of the mass of the beam and any accretion thereon. The signal from the strain gauges on the spring blade 45' will then vary sinusoidally in response to the vibrations, and the signal can then be analysed both for amplitude and for frequency. In practice the beam will be most likely to vibrate at its own natural frequency in response to natural vibration in the de-watering area of the paper-making plant, for example due to the operation of the wire drive mechanism and support rolls, so that the signal only needs to be evaluated in order to ensure that the frequency determined is the first natural frequency rather than a harmonic.

As indicated above, in the case of the vibrational probe the further the build-up is from the mounting (pivot) the more noticeable will be the change in its natural frequency of oscillation.

Similarly, in the case of the static probe the turning moment causing the probe to displace from its rest position when free of deposit will be affected more greatly by build-ups of deposit remote from the pivot than by such a build-up closer to the pivot. The elongate nature of the probe allows for this possibility of accretion of build-up displaced from the probe pivot.

In some environments there may be a greater tendency for accretion of build-up than in others, and equally in some machines there may be space for a longer probe than in other machines. It is therefore envisaged that the length of the probe may be adjustable in order to allow the probe to be tailor-made for a particular machine. This adjustment may be achieved either by providing a single probe of variable length or, more preferably, by providing a range of probes of which an appropriate one can be selected in order to suit the characteristics of the machine in question.

One possible modification of the sensor shown in FIG. 2, in order to work in the resonance-responsive mode, would be for the two spring blades 45 to work instead as spring contacts of a switching system so that when, during vibration of the machine to be monitored, in this case the paper-making machine, the probe oscillates about its pivot 32 (in response to an increased mass on the left hand side of the probe exposed to the likelihood of build-up of deposit in use of the machine) the upper and lower spring blades 45 and 45' will alternately contact their respective adjuster screws 44 and 44', provided the screws are sufficiently far apart to allow a situation where only one of the spring blades 45 and 45' will be contacting its adjacent screw at any one time. Clearly, then, when the probe tilts slightly in the anti-clockwise direction the upper adjuster screw 44 and spring blade 45 will be out of contact while the lower adjuster screw 44' and spring blade 45' will be in contact, and when the probe is tilted in the clockwise direction the upper screw and blade 44 and 45' will be in contact and the lower screw and blade 44' and 45' will be out of contact. The frequency of alternation between these two states can be measured and will be the resonant frequency of the combination of the probe 30, its counterbalance weight 33, and the build-up of deposit on the probe 30, with the arrangement such that because the probe 30 (minus deposit) and the balance weight 33 are accurately balanced about the axis of bearing 32 any out-of-balance will result from the deposit on the probe 30 and the magnitude can therefore be related to the resonant frequency of the assembly 30, 33.

Figure 4:
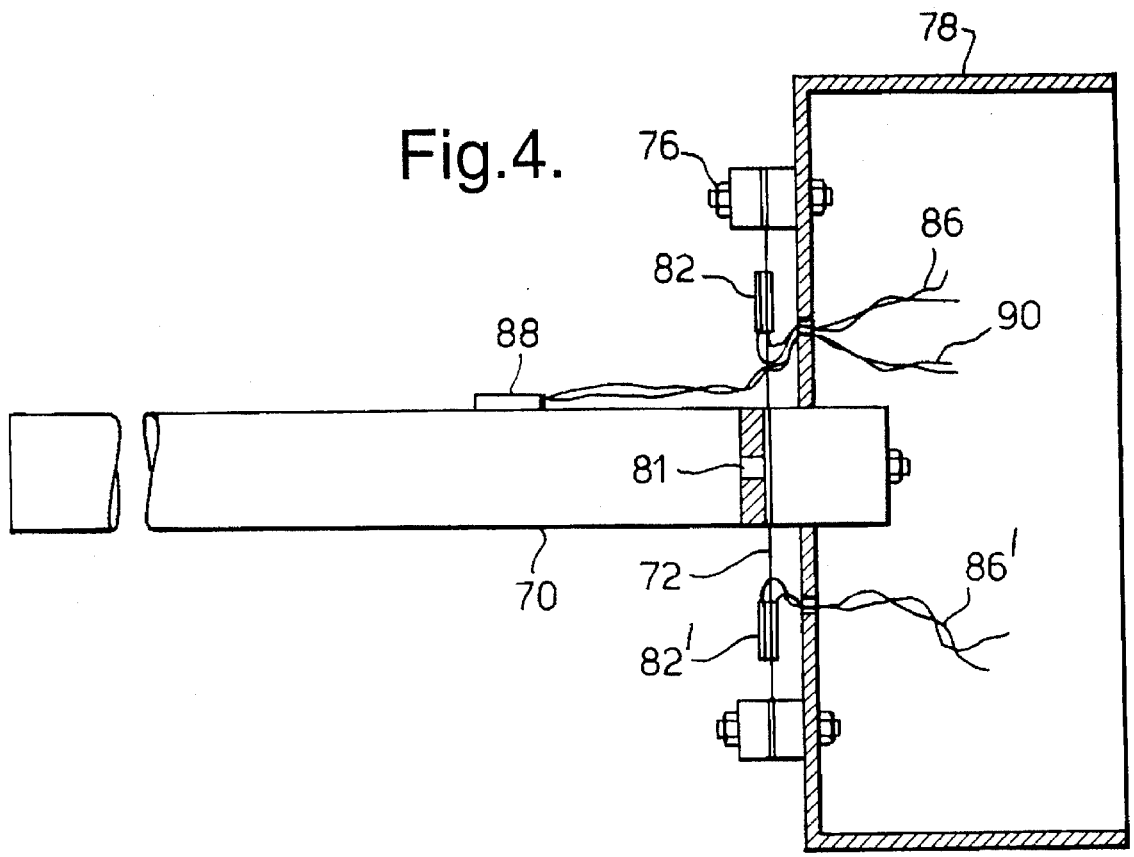
FIG. 4 is a sectional view of a second embodiment of sensor in accordance with the present invention.
Figure 5:
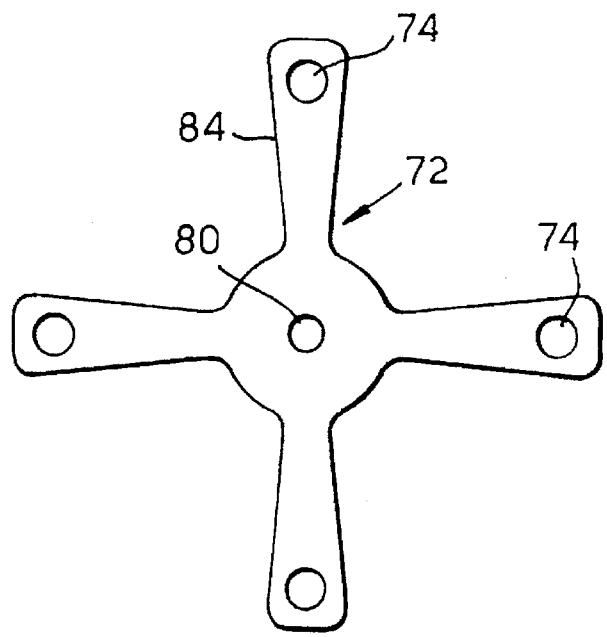
FIG. 5 is a view showing the mounting diaphragm of the sensor of FIG. 4.

An alternative embodiment of the probe is illustrated in simplified form in FIG. 4. Here the probe 70, again in the form of a hollow stainless steel tube. In this case the mount for the probe is a cruciform diaphragm 72 which is shown in side view in FIG. 4 but is shown in frontal view in FIG. 5. Each of the four limbs of the diaphragm 72 includes a hole 74 to receive a mounting screw 76 which clamps the end of that limb of the diaphragm to a mounting body 78. Similarly the centre of the mounting diaphragm includes a hole 80 for receiving a mounting stud 81 at the preferably solid proximal end of the probe 70 and the tension in the various limbs of the cruciform mounting diaphragm 72 result in the probe 70 being substantially horizontal in its rest condition. Strain gauges 82 and 82' on the upper and lower vertical limbs 84 and 84', respectively, of the mounting diaphragm 72 provide signals, by way of connecting leads 86, 86' indicative of the loading on the probe in that when the probe tilts in the anti-clockwise direction (by drooping of the distal end of the probe 70) the limbs 84 and 84' will tend to flex and as a result there will be a change in strain to be measured by the strain gauges 82.

With the strain gauges 82 placed in the relatively short limbs 84 of the diaphragm and hence close to the point of clamping of the diaphragm between the hollow (leftwardly) projecting portions of the probe 70 and the counterbalancing solid section to the right of the diaphragm, the effect of the force of the uniformly distributed build-up along the probe 70 due to the moment arm of the build-up which is balanced by an excess in the flexural deformation of the limbs 84 over and above the deformation which will occur when an unloaded probe 70 is supported by the diaphragm will be such as to magnify the effect of that force due to the mass of the build-up and to generate an electrical output signal from the strain gauges 82, 82' which is readily readable in terms of milliamps as a result of a typical thin film deposit on the probe 70. Again there is a force magnifying effect due to the long moment arm on the probe 70 and the short length of the limbs 84 of the diaphragm.

The embodiment of probe in FIG. 4 is analogous in its mounting to the embodiment of FIG. 2 in that here again the probe is substantially without flexural deformation of its own but is mounted in a statically balanced configuration in the absence of a build-up, and has a portion of the probe extending into the region where build-up is expected and being mounted such that flexing of the flexible strain gauge-bearing member results from an out-of-balance of the probe resulting from build-up distributed over the projecting part.

The horizontal limbs of the diaphragm 72 serve simply to enhance the mounting of the probe 70 but during loading of the probe with deposit to increase the weight of the probe these horizontal limbs will not be deflected. They may, however, be subject to deflection in the event of machine vibration in a horizontal direction and it is therefore possible to use this vibration-responsive flexure to measure the resonant frequency of the combination of the probe 70 with deposit thereon if additional strain gauges are attached to the horizontal limbs.

This particular embodiment shows the optional additional cell 88 with its connector leads 90, this cell serving to detect the nature of the deposit on the probe, as described above.

A further embodiment of the method and apparatus of the invention can be incorporated as a modification of either of the two forms of the probe where the vibration is measured, in that a vibrator can be incorporated in the probe mounting so as to initiate the vibration of the probe in order to allow either the amplitude of vibration or the resonant frequency of the vibration to be monitored using the strain gauges shown in either FIG. 2 or FIG. 4, or the switching possibility exemplified above as a modification of the probe of FIG. 2.

The circular cross-section of the probe 30 ensures that there is no problem concerning orientation of the probe when mounted on wall 40 of the plant being monitored, as the bending response will be the same in all orientations of the cylinder defining the probe.

This circular form of the probe is also particularly suitable for an omni-directional incidence of the deposit, for example in the case of a water monitoring system where the deposit will precipitate from the water around the probe. In other cases it may be desirable to vary the cross-section of the elongate probe either for adapting it to the particular geometry of the location where the probe is installed, or to adapt it to a known direction of arrival of the deposit. For example, in the case of a soot monitoring application it may be advantageous to provide the probe in the form of a plate or a paddle on the end of an arm, where the plate or paddle has a plane extending generally perpendicular to the direction of incidence of the deposit, in order to catch as much of the deposit as is possible.

Cross-sections other than circular or plate-shaped are possible depending on the requirements of the environment to be monitored.

The down-line operation which may be controlled in response to the output of the sensor can be any one of a number of different operations, as indicated above, but equally the manner in which that control is exercised can also be in one of various different forms.

As a first possibility the output of the sensor can be used to display a signal which can be interpreted by an operator who then changes the rate of execution of the down line operation (for example the rate of dosing of a paper mill with a composition which inhibits the growth of biological film therein) in order to maintain optimum conditions, in response to the information portrayed by the displayed signal indicative of deposition quantity. Such a system could be referred to as a semi-automatic control system.

A second basic form of the control may be an automatic one which relies on direct application of the output from the sensor to the speed control or displacement control of a pump in order to vary the rate of dosing, for example by changing the speed or by varying the displacement, of the pump. Such a system responds purely to the actual acquisition of build-up with time and may rely on a control regime which effectively plots total build-up of deposit against time and reacts to that build-up.

A third, more intelligent, automatic control regime may be one in which the controller assesses the general trend of the deposition signal to detect whether the rate of increase is itself increasing or reducing, in order to increase the dosing rate more noticeably in the case of a rising rate of build-up of deposit and to reduce the dosing rate when the rate of change of build-up quantity is itself reducing. Such a system allows a measure of prediction of future build-up value and is therefore to some extent predictive rather than purely reactive.

A still further version of an "intelligent" automatic control regime may be one which combines the second and the third regimes mentioned above, i.e. part of the control action is in response to the actual quantity of build-up, and part is in response to the trend of the change in build-up, for example by comparing the actual rate of change with a predicted "expected" rate of change.

The hardware for effecting the "intelligent" third and fourth control regimes just mentioned may rely on a programmable logic controller (plc) to be programmed with software to exercise the appropriate control over the downline (e.g. dosing) operation.

If the output of the strain gauges is plotted over a period of days, there will be a two or three days period before the signal is evident (i.e. before any appreciable build-up of deposit has occurred) and then the signal will gradually rise to a plateau indicating a build-up consistent with the need for it to be eliminated by remedial action in the process under control.

We claim:

1. A method of measuring the build-up of deposit comprising the steps of:

mounting an elongate probe to project into a region where the build-up will appear;

balancing the probe about a pivot in the absence of deposit on the projecting probe;

allowing the deposit to build up on the projecting portion of said probe; and sensing lateral deflection of said projecting portion of the probe adjacent said pivot by changing strain on a flexible member caused to flex by the imbalance generated in said probe as a result of the deposit thereon, to detect variations in the mass of said probe as being indicative of the build-up of said deposit on the projecting portion of the probe.

2. A method according to claim 1, wherein said monitoring of the probe is effected by static measurement of the moment on the probe.

3. A method according to claim 1, wherein the probe is mounted in cantilever fashion and the variations in the mass of the probe are detected by measuring the strain of the cantilever mounting.

4. A method of controlling build-up of deposit in an industrial apparatus, comprising measuring the build-up by a method of claim 1, and including the step of controlling the dose of the application of a deposit-inhibiting composition in response to the mass variations detected.

5. A method according to claim 4, including the steps of selecting one of several deposit-inhibiting compositions to be added to said region, and further including providing a sensor responsive to the nature of the deposit on the probe, and selecting a said deposit-controlling composition to be most effective for the nature of the deposition identified.

6. A method according to claim 4, and including the steps of displaying a signal representative of the detected mass variation of said probe, and adjusting the dose of the application of said composition in response to the signal displayed.

7. A method according to claims 4, and including the steps of determining the rate of change of build-up with time, and comparing the determined rate of change with an expected rate of change, to increase or decrease the rate of dosing in response to a rise or a fall in the rate of build-up with time.

8. A method according to claim 4, wherein the rate of dosing is at least partially controlled in direct response to the build-up detected by the probe.

9. A sensor for determining the build-up of a deposit in industrial equipment, comprising:

an elongate probe having a proximal end and a distal end and adapted to be installed with said distal end in a region of the equipment where monitoring is to be effected;

a pivot support for said probe;

a flexurally deformable member arranged to be strained flexurally by pivoting of said probe about said pivot support;

at least one strain gauge for measuring the flexural strain of said flexurally deformable member in response to the weight of the probe and any accretion of deposit built up thereon; and means for monitoring the magnitude of the flexural strain continuously through the life of the plant.

10. A sensor according to claim 9, wherein said pivot support is attached to said flexurally deformable member and said pivot support is adjacent said proximal end of said probe.

11. A sensor according to claim 9, wherein said probe is cylindrical in cross-section.

12. A sensor according to claim 9, and including a mounting body adapted to be secured to the exterior of a wall of plant to be monitored; and bearing means pivotally supporting said probe in said mounting body, to project transverse to the extent of a said wall on which the mounting body can be mounted, said deformable member being adapted to be contacted by a part of the pivotal probe near the bearing means to deform the flexible member flexurally in response to pivoting of the probe.

* * * * *